United States Patent [19]

Barnes et al.

[11] Patent Number: 4,832,441
[45] Date of Patent: * May 23, 1989

[54] OPTICAL FIBER CABLE

[75] Inventors: Stuart R. Barnes, Woodford Green; Ralph Sutehall; Robert S. F. Clarke, both of Harlow, all of Great Britain

[73] Assignee: STC PLC, London, England

[*] Notice: The portion of the term of this patent subsequent to Dec. 29, 2004 has been disclaimed.

[21] Appl. No.: 874,324

[22] Filed: Jun. 13, 1986

[30] Foreign Application Priority Data

Jun. 27, 1985 [GB] United Kingdom ................. 8516290

[51] Int. Cl.⁴ .............................................. G02B 6/44
[52] U.S. Cl. .................................................. 350/96.23
[58] Field of Search ...................................... 350/96.23

[56] References Cited

U.S. PATENT DOCUMENTS

| 4,156,104 | 5/1979 | Mondello | 350/96.23 X |
| 4,447,122 | 5/1984 | Sutehall | 350/96.23 |
| 4,538,881 | 9/1985 | Anctil et al. | 350/96.23 |
| 4,691,989 | 9/1987 | Blyler, Jr. | 350/96.23 |
| 4,715,676 | 12/1987 | Sutehall et al. | 350/96.23 |

FOREIGN PATENT DOCUMENTS

| 0034286 | 8/1981 | European Pat. Off. | 350/96.23 |
| 0130728 | 1/1985 | European Pat. Off. | |
| 1436319 | 5/1976 | United Kingdom | |
| 1486227 | 9/1977 | United Kingdom | |
| 2060929 | 5/1981 | United Kingdom | 350/96.23 |
| 1589115 | 5/1981 | United Kingdom | |
| 2099179 | 12/1982 | United Kingdom | |
| 2136350A | 2/1983 | United Kingdom | |
| 2127578 | 4/1984 | United Kingdom | |

OTHER PUBLICATIONS

Hoeschele, "Segmented Polyether Ester Copolymers—A New Generation of High Performance Thermoplastic Elastomers", *Polymers Engineering and Science*, vol. 14, No. 12, Dec. 1974, pp. 848–852.

Communications Spectra, "Fiber Optic Systems Take the Plunge", *Photonics Spectra*, May 1982, pp. 39–42, vol. 16, No. 5, (350/96.23).

Kao et al., "Fiber Cable Technology", *Journal of Lightwave Technology*, vol. LT-2, No. 4, Aug. 1984, pp. 479–488, (350/96.23).

Primary Examiner—John D. Lee
Attorney, Agent, or Firm—Lee & Smith

[57] ABSTRACT

An optical fiber cable package has a kingwire and a plurality of acrylate primary coated optical fibers all embedded in a one-shot extrusion of low melting point plastic, e.g. Hytrel 40. The fibers have a zero angle of lay. The package is particularly but not exclusively suitable for use in an optical fiber submarine cable.

17 Claims, 2 Drawing Sheets

OPTICAL FIBER CABLE

BACKGROUND OF THE INVENTION

This invention relates to optical fiber cables.

We currently manufacture an optical fiber cable particularly for submarine telecommunication links and a cross section of this cable is shown in FIG. 1 of the accompanying drawings. It comprises an optical fiber package A loosely housed in a bore D within a strain member tube formed by a closed conductive C-section E surrounded by high tensile steel wires G, optionally surrounded by a copper tape H hermetically sealed at $G^1$. Extruded around the wire layer G is a polythene dielectric layer J and for shallow waters an armoring K is applied, although for deep water this is unnecessary. There can be two layers of wires G and the tube E is preferably hermetically sealed by welding.

The optical fiber package A comprises several optical fibers B with primary and secondary coatings disposed around a plastic-coated king wire $A^1$ and held together by a fiber whipping C (such as "Kevlar").

This cable is expensive in terms of fiber channels since only eight optical fibers are housed in it. With the advent of repeaterless links any constraint upon the number of fibers imposed by the repeater will disappear and it would be more economical to have a larger number of fibers in such a cable.

So-called acrylate-coated fibers are now available which have a smaller diameter than their secondary-clad counterparts and we have attempted to modify our existing fiber package to incorporate these fibers. We have incorporated the fibers into a package in a number of different ways, but without success. For example, we have bound a number of acrylate coated fibers directly onto a copper-coated high tensile steel kingwire 0.7mm diameter, using a Kevlar whipping but found that the loss of the fibers above the 1300 nm window was excessive, due mainly to microbending. We therefore increased the buffering between the kingwire and the fibers. We tried a plastic coated kingwire (0.5 mm kingwire coated to 0.7 mm) which showed little improvement, and so we tried a heavily buffered kingwire 0.2 diameter buffered with a softer plastic to 0.7 mm, but still with unacceptably high microbending losses, particularly above the 1300 nm window, e.g. 1550 nm.

We therefore considered alternative package structures. For example, British patent specification No. 2136350A discloses an undersea communications cable core in which a central strength member is heated and a first layer of elastomer is extruded onto the heated strength member. Then optical fibers are laid along a helical path onto the first layer of elastomer with a planetary motion. A second layer of elastomer is extruded over the fibers and merges with the first layer. A protective layer sheath is extruded around the second layer. This is said to minimize microbending losses with respect to the sea bottom pressure. However, it is a complicated and expensive manufacturing process, and it is believed that microbending losses, particularly during storage will still be significant at the longer wavelength mentioned above.

SUMMARY OF THE INVENTION

It is an object of the present invention to provide a technically effective package structure particularly but not exclusive for a submarine cable, and one which is cost effective.

According to the present invention there is provided an optical fiber cable package comprising a tensile strength filament and a plurality of coated optical fibers, all mutually spaced apart from one another and embedded in a plastic material which has been extruded directly into contact with the filament and the optical fibers.

According to another aspect of the present invention there is provided a method of making an optical fiber cable package comprising feeding a plurality of coated optical fibers and a tensile strength filament through an extrusion head, said head comprising an extrusion point through which the fibers and filament are supported in a mutually-spaced-apart relationship in respective holes in the point, and extruding a low-melting-point plastic material directly into contact with the tensile strength filament and the fiber coatings.

We have quite unexpectedly achieved a satisfactory mutual spacing of the fibers in the package despite the high pressure of between 1500 and 3000 pounds per square inch in the extrusion head. It was expected that this pressure would cause damage to the fibers and severe distortion of the circular spacing but this has proven not to be the case.

BRIEF DESCRIPTION OF THE DRAWINGS

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
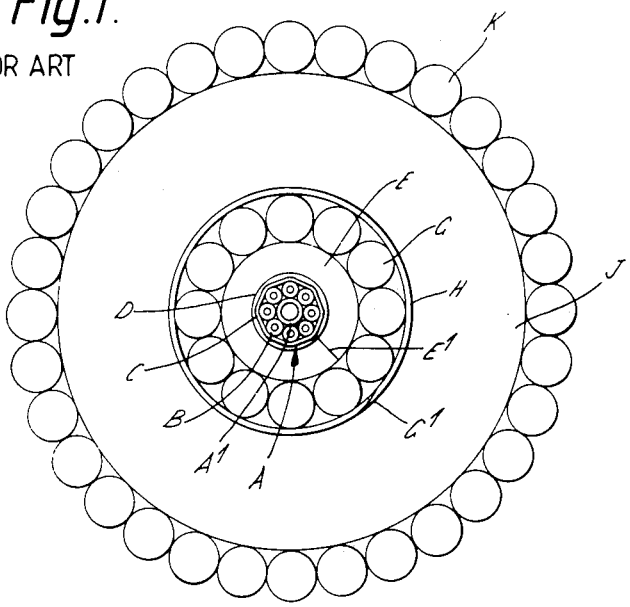
FIG. 1 which shows a submarine cable cross section according to the prior art.

FIG. 1 of the drawings has already been described.

Figure 2:
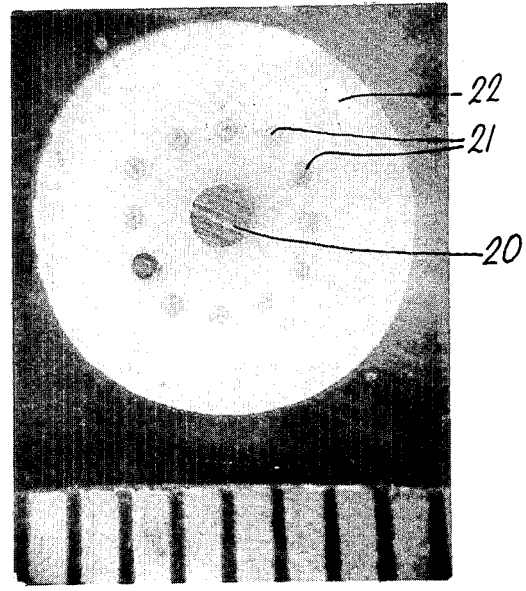
FIG. 2 shows a photograph of a cross section of an optical fiber cable package made according to an embodiment of the present invention.

FIG. 2 shows in cross section an optical fiber cable package we have made particularly but not exclusively suitable in place of the package shown in the cable of FIG. 1. However, it could be used for other loose tube applications; e.g., in a blown duct optical fiber cable installation or in a loose tube land cable. Referring to FIG. 2, the package comprises a central kingwire 20 surrounded by a plurality (twelve in this embodiment) of acrylate-coated optical fibers such as 21, disposed in a circular array and all embedded in a plastic extrusion 22. The plastic extrusion is soft relative to the acrylate primary coating of the fibers and has a low melting point in relation to the fiber primary coating. In the embodiment described the extruded plastics is a thermoplastic polymer sold under the trade name Hytrel 40D. It has a Shore D hardness of 40. Another plastic material would be suitable provided the Shore hardness does not exceed 55 and the melting point does not exceed about 200° C. Secondary coated fibers could also be employed.

We have discovered that temperatures of extrusion much above 200° C. tend to cause outgassing of the fiber coatings and the kingwire resulting in tiny gas bubbles becoming locked in the extrusion, which tend to increase the losses due to microbending.

Another important feature of the present invention is that the optical fibers are not laid up in the conventional way, as in the package of FIG. 1 and the cable core in the above mentioned British patent specification No. 2136350A. Instead, they are set exactly parallel to the central axis of the package, i.e. with a zero angle of lay. We have found this to be fairly critical in reducing microbending losses, and the tooling to enable this to be achieved, along with a very accurate spacing to close tolerances within the extrusion is shown in FIGS. 3 and 4.

Figure 3:
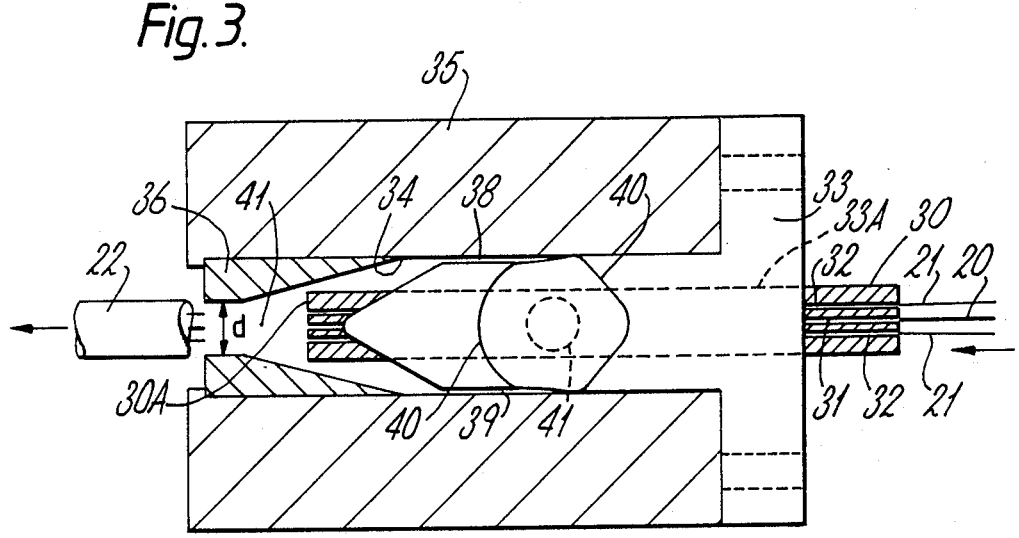
FIG. 3 shows in axial cross section the extrusion head for making the package shown in FIG. 2.

Referring to FIG. 3, the extrusion head comprises an extrusion point 30 (shown partly in axial cores section) about seven centimeters long having a central bore 31 (FIG. 4) for the kingwire 20 and twelve parallel bores 32 around the central bore 31 to carry the twelve optical fibers 21 entering from the right hand side.

Figure 4:
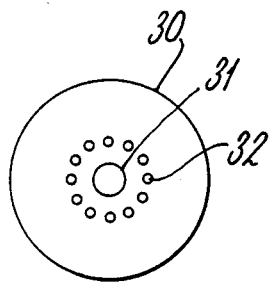
FIG. 4 shows an end view of part of FIG. 3.

This extrusion point is shown in end view in FIG. 4. It is secured in an extrusion point holder 33 (shown in full line) which itself is secured in a bore 34 in extrusion crosshead 35 (shown in axial cross section). An extrusion core die 36 (shown in axial cross section) defines the external diameter d of the cable package 22 and the longitudinal gap between the die 36 and the adjacent end 30A of the point determines the pressure at which the thermoplastic material is extruded. This gap is adjustable by moving the extrusion point 30 which is adjustable by screwing it into or out of the point holder 33 which is internally screw threaded at the right hand end of the internal bore 33A of the holder 33.

The holder 33 has a shaped surface defining extrusion passages 38 and 39 between the holder 33 and the bore 34 and an entrance region 40 where the extrusion material is injected via a hole 41 (indicated in broken line) in the block 35. This profile gives an equal hydrostatic pressure around the emerging fibers in the extrusion chamber 41 and "wets" the surfaces of the fibers 21 and kingwire 20.

The extrusion pressure lies in the range 1500 to 3000 pounds per square inch and the extrusion rate is at least fifteen meters per minute. The fibers are drawn through the extrusion head under a tension of 50 grams each fiber, although the tension could lie in the range 30 grams to 100 grams.

As discussed in the preferred embodiment there are twelve acrylate coated optical fibers having an outer diameter of about 0.25 mm and a single central strength member filament of high tensile steel having an outer diameter of 0.7 mm. The overall diameter of the package is about 3.6 mm. There could be more or less than twelve optical fibers. Further, some of the fibers could be replaced by further strength member filaments, e.g. high strength plastic filaments made of e.g. Kevlar depending on the use to which the package is to be put.

It would also be possible to replace the package of FIG. 1 with two or more packages each as shown in FIG. 2, modified or not as discussed here. An advantage of the package shown in FIG. 2 is that its smooth hard surface compared with the bound package of FIG. 1, does not get "nipped" by the closing edges of the C-section during manufacture.

While we have described above the principles of our invention in connection with specific apparatus, it is to be clearly understood that this description is made only by way of example and not as a limitation to the scope of our invention as set forth in the objects thereof and in the accompanying claims.

We claim:
1. An optical fiber cable comprising:
   a central filament;
   a plurality of optical fibers surrounding and spaced from said
   filament, each of said fibers having a primary coating and each being spaced from one another; and a plastic material which comprises a single integral element in which said tensile strength filament and said primary coated optical fibers are embedded to protect said fibers and form an optical fiber package, said plastic material being in contact with the primary coating of the optical fibers and the central filament, said fibers having a zero angle of lay about said central filament.
2. The cable of claim 1 wherein said primary coating is of an acrylate material.
3. An optical fiber cable as claimed in claim 1, comprising a strain member tube surrounding said package, said tube providing said cable with tensile strength and resistance to hydrostatic pressure, said cable being suitable for use as a submarine telecommunications cable.
4. The cable of claim 1 wherein said plastic material is a Hytrel polymer having a Shore hardness of 40D.
5. The cable of claim 1 further comprising a strength member sheath in which said optical fiber package is loosely housed for withstanding forces applied to the cable.
6. The cable of claim 5 wherein said sheath includes a tubular member which is hermetically sealed.
7. The cable of claim 5 further comprising a water blocking compound located between said optical fiber package and said sheath.
8. An optical fiber cable comprising:
   a central strength filament;
   a plurality of optical fibers surrounding and spaced from said tensile strength filament, each of said fibers being secondary coated and each being spaced from one another; and
   a single integral plastics element in which said tensile strength filament and said secondary coated optical fibers are embedded to protect said fibers and form an optical fiber package, said plastics element
   being in contact with the secondary coating of the optical fibers and the tensile strength filament, said fibers having a zero angle of lay around said central strength filament.
9. An optical fibre cable as claimed in claim 8, comprising a strain member tube surrounding said package, said tube providing said cable with tensile strength and resistance to hydrostatic pressure, said cable being suitable for use as a submarine telecommunications cable.
10. An optical fiber cable comprising:
    a central strength member filament;
    a plurality of optical fibers surrounding and spaced from said tensile strength filament, the optical fibers surrounding the tensile strength filament with a zero angle of lay, each of said fibers being coated with an acrylate material and each being spaced from one another; and
    an extrusion of a HYTREL polyer which comprises a single integral element in which said tensile strength filament and said acrylate coated fibers are embedded to protect said fibers and form an optical fiber package, said Hytrel polymer being in contact with the acrylate coating of the optical fibers and the tensile strength filament.

11. An optical fiber cable as claimed in claim 10, comprising a strain member tube surrounding said package, said tube providing said cable with tensile strength and resistance to hydrostatic pressure, said cable being suitable for use as a submarine telecommunications cable.

12. A method of making an optical fiber cable comprising the steps of:
feeding a plurality of fibers having respective solid primary coatings and a central tensile strength filament through an extrusion head having an extrusion point through which the optical fibers and the filament are supported in mutually spaced apart relationship; and
extruding a plastic material in a single shot to surround the tensile strength filament and the optical fibers with a single integral element, said extruded plastic material being in contact with the primary coating of the optical fibers and the central tensile strength filament, said fibers having a zero angle of lay.

13. The method of claim 12 further comprising the step of maintaining the fibers and the filament in parallel spaced apart relationship over a length of at least four centimeters in respective parallel holes in the point.

14. The method of claim 12 wherein the primary coating is of acrylate plastic material.

15. The method of claim 12 wherein the extruding step is performed at a temperature not exceeding 200° C.

16. The method of claim 12 wherein the feeding of the optical fibers is performed under tension not exceeding 50 grams per fiber.

17. A method of making an optical fiber cable comprising the steps of:
feeding a plurality of acrylate coated optical fibers and a strength filament through an extrusion head having an extrusion point through which the optical fibers and the filament are supported in mutually spaced relationship with the optical fibers surrounding the filament with zero angle of lay and being spaced from one another and the filament, the filament being disposed centrally of the optical fibers; and
extruding a Hytrel polymer in a single shot to surround the tensile strength filament and the acrylate coated fibers with a single integral element, said extruded Hytrel polymer being in contact with the acrylate coating on the optical fibers and the tensile strength filament over the whole of their respective surfaces.

* * * * *